(12) United States Patent
Zhang et al.

(10) Patent No.: US 11,535,211 B2
(45) Date of Patent: Dec. 27, 2022

(54) VEHICLE BRAKE SYSTEM AND METHOD OF DETECTING PISTON LOCATION OF A PLUNGER ASSEMBLY

(71) Applicant: ZF Active Safety US Inc., Livonia, MI (US)

(72) Inventors: Wendy Zhang, Farmington Hills, MI (US); Patrick Hartman, Canton, MI (US); Weichao Kong, Farmington Hills, MI (US)

(73) Assignee: ZF Active Safety US Inc., Livonia, MI (US)

( * ) Notice: Subject to any disclaimer, the term of this patent is extended or adjusted under 35 U.S.C. 154(b) by 296 days.

(21) Appl. No.: 16/957,771

(22) PCT Filed: Dec. 31, 2018

(86) PCT No.: PCT/US2018/068116
§ 371 (c)(1),
(2) Date: Jun. 25, 2020

(87) PCT Pub. No.: WO2019/133960
PCT Pub. Date: Jul. 4, 2019

(65) Prior Publication Data
US 2021/0061240 A1    Mar. 4, 2021

Related U.S. Application Data

(60) Provisional application No. 62/612,490, filed on Dec. 31, 2017, provisional application No. 62/612,489, filed on Dec. 31, 2017.

(51) Int. Cl.
*B60T 7/04*     (2006.01)
*B60T 13/68*    (2006.01)
(Continued)

(52) U.S. Cl.
CPC ............ *B60T 7/042* (2013.01); *B60T 13/686* (2013.01); *B60T 13/662* (2013.01); *B60T 13/745* (2013.01);
(Continued)

(58) Field of Classification Search
CPC .............................. B60T 13/745; B60T 8/409
See application file for complete search history.

(56) References Cited

U.S. PATENT DOCUMENTS 5,433,514 A * 7/1995 Tsukamoto ........... B60T 8/4863
303/113.2
8,371,661 B2 * 2/2013 Leiber ...................... B60T 8/44
303/3

(Continued)

*Primary Examiner* — Thomas E Lazo
(74) *Attorney, Agent, or Firm* — Robert James Harwood

(57) ABSTRACT

A method of determining a homing position of a piston within a plunger assembly for a vehicle brake system at the beginning of an ignition cycle of the vehicle includes first providing a plunger assembly having a housing defining a bore therein. The plunger assembly includes a piston slidably disposed in the bore for pressurizing fluid within a pressure chamber when the piston is moved in a first direction. The plunger assembly further includes an electrically operated linear actuator for moving the piston within the bore. The method further includes providing electrical power to the linear actuator of the plunger assembly. The linear actuator is actuated to retract the piston in a second direction opposite the first direction towards an end stop. The piston engaging with the end stop is then detected.

16 Claims, 8 Drawing Sheets

(51) Int. Cl.
  *B60T 13/66*   (2006.01)
  *B60T 13/74*   (2006.01)
  *F16H 25/22*   (2006.01)
  *F16H 25/20*   (2006.01)

(52) U.S. Cl.
  CPC ....... *B60Y 2400/81* (2013.01); *F16H 25/2204* (2013.01); *F16H 2025/2078* (2013.01)

(56) References Cited

U.S. PATENT DOCUMENTS

| | | | |
|---|---|---|---|
| 9,205,821 B2* | 12/2015 | Biller | B60T 13/58 |
| 9,321,444 B2* | 4/2016 | Ganzel | B60T 13/745 |
| 9,475,473 B2* | 10/2016 | Charpentier | B60T 11/20 |
| 9,566,962 B2* | 2/2017 | Böhm | B60T 8/326 |
| 9,797,416 B2* | 10/2017 | Giese | B60T 11/20 |
| 10,358,119 B2* | 7/2019 | Besier | B60T 13/142 |
| 2012/0112525 A1* | 5/2012 | Shimada | B60T 8/4081 303/10 |
| 2014/0053546 A1* | 2/2014 | Charpentier | B60T 11/20 60/562 |
| 2014/0265544 A1* | 9/2014 | Ganzel | B60T 13/662 303/6.01 |
| 2015/0239438 A1* | 8/2015 | Bohm | B60T 7/042 701/70 |
| 2016/0137178 A1* | 5/2016 | Böhm | H01F 7/064 701/70 |
| 2016/0375886 A1* | 12/2016 | Jung | B60T 13/745 303/15 |

* cited by examiner

VEHICLE BRAKE SYSTEM AND METHOD OF DETECTING PISTON LOCATION OF A PLUNGER ASSEMBLY

CROSS-REFERENCE TO RELATED APPLICATIONS

This application is a national stage of International Application No. PCT/US18/068116, filed Dec. 31, 2018, the disclosure of which is incorporated herein by reference in its entirety, and which claimed priority to U.S. Provisional Patent Application No. 62/612,489, filed Dec. 31, 2017, and U.S. Provisional Patent Application No. 62/612,490, filed Dec. 31, 2017, the disclosure of which is incorporated herein by reference in its entirety.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Brake systems may also include autonomous braking capabilities such as adaptive cruise control (ACC). During an autonomous braking event, various sensors and systems monitor the traffic conditions ahead of the vehicle and automatically activate the brake system to decelerate the vehicle as needed. Autonomous braking may be configured to respond rapidly in order to avoid an emergency situation. The brake system may be activated without the driver depressing the brake pedal or even if the driver fails to apply adequate pressure to the brake pedal. Advanced autonomous braking systems are configured to operate the vehicle without any driver input and rely solely on the various sensors and systems that monitor the traffic conditions surrounding the vehicle.

SUMMARY OF THE INVENTION

This invention relates to a method of determining a homing position of a piston within a plunger assembly for a vehicle brake system at the beginning of an ignition cycle of the vehicle includes first providing a plunger assembly having a housing defining a bore therein. The plunger assembly includes a piston slidably disposed in the bore for pressurizing fluid within a pressure chamber when the piston is moved in a first direction. The plunger assembly further includes an electrically operated linear actuator for moving the piston within the bore. The method further includes providing electrical power to the linear actuator of the plunger assembly. The linear actuator is actuated to retract the piston in a second direction opposite the first direction towards an end stop. The piston engaging with the end stop is then detected.

This invention also relates to a method of detecting the position of a piston relative to a compensation port and seal configuration of a plunger assembly. The method includes first providing a fluid reservoir and a plunger assembly having a housing defining a bore therein. The plunger assembly includes a piston slidably disposed in the bore for pressurizing fluid within a pressure chamber when the piston is moved in a first direction by a linear actuator. The plunger assembly includes a port in fluid communication with the fluid reservoir and with the pressure chamber when the piston is in a first position. The port is prevented from being in fluid communication with the pressure chamber when the piston is in a second position caused by the spacial relationship between a seal and the port within the housing of the plunger assembly. The method includes positioning the piston in a retracted position and then measuring the difference between the retracted position of the piston and a linear zero position of the piston wherein the port is positioned adjacent the seal by a relatively small distance such that the port is in fluid communication with the fluid reservoir and with the pressure chamber.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
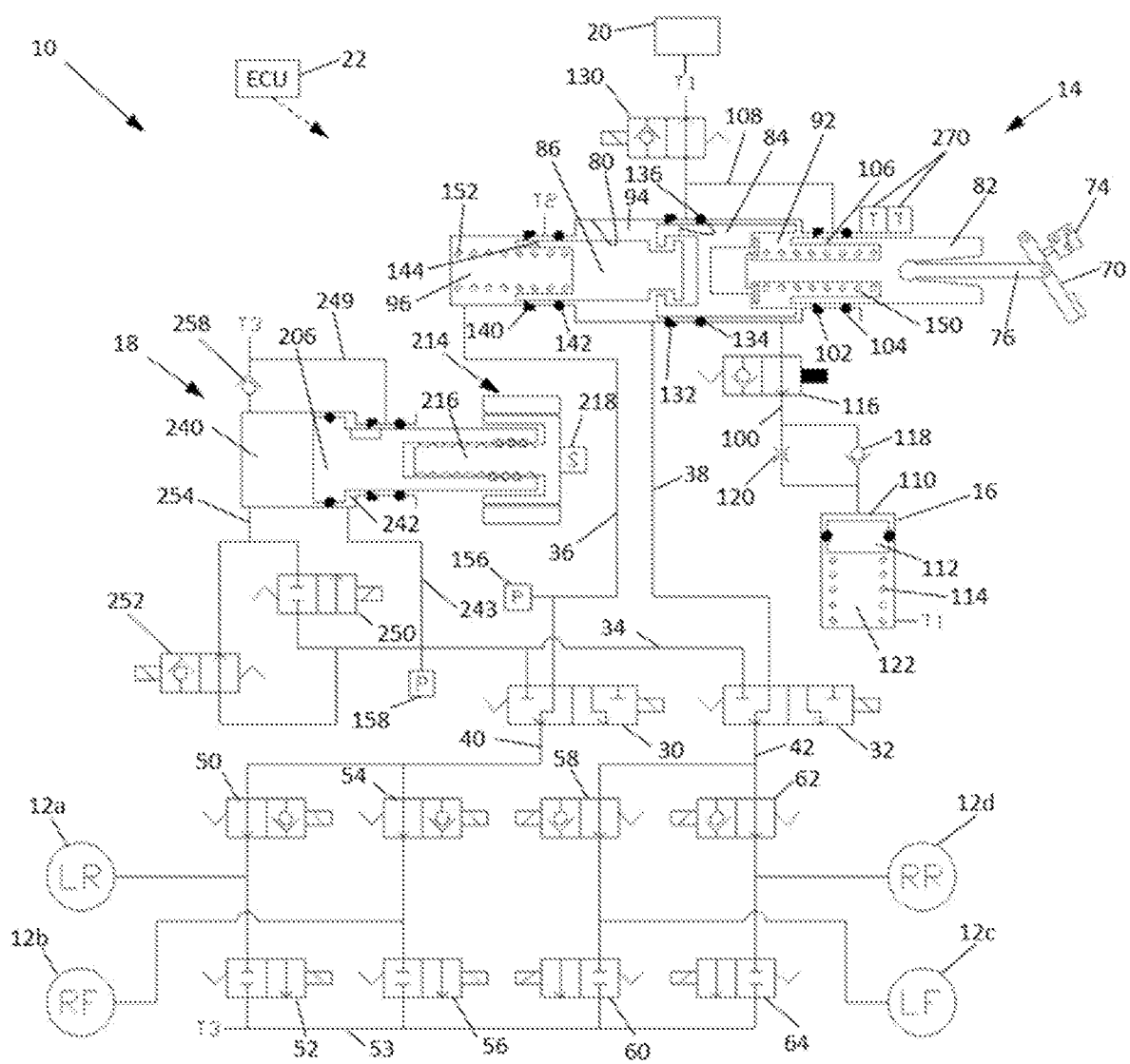
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic braking system in which fluid pressure from a source is operated to apply braking forces for the brake system 10. The brake system 10 may suitably be used on a ground vehicle such as an automotive vehicle having four wheels. Furthermore, the brake system 10 can be provided with other braking functions such as anti-lock braking (ABS) and other slip control features to effectively brake the vehicle, as will be discussed below. In the illustrated embodiment of the brake system 10, there are four wheel brakes 12a, 12b, 12c, and 12d. The wheel brakes 12a, 12b, 12c, and 12d can have any suitable wheel brake structure operated by the application of pressurized brake fluid. The wheel brakes 12a, 12b, 12c, and 12d may include, for example, a brake caliper mounted on the vehicle to engage a frictional element (such as a brake disc) that rotates with a vehicle wheel to effect braking of the associated vehicle wheel. The wheel brakes 12a, 12b, 12c, and 12d can be associated with any combination of front and rear wheels of the vehicle in which the brake system 10 is installed. A diagonally split brake system is illustrated such that the wheel brake 12a is associated with the left rear wheel, the wheel brake 12b is associated with the right front wheel, the wheel brake 12c is associated with the left front wheel, and the wheel brake 12d is associated with the right rear wheel. Alternatively for a vertically split system, the wheel brakes 12a and 12b may be associated with the front wheels, and the wheel brakes 12c and 12d may be associated with the rear wheels.

The brake system 10 includes a brake pedal unit, indicated generally at 14, a pedal simulator 16, a plunger assembly, indicated generally at 18, and a reservoir 20. The reservoir 20 stores and holds hydraulic fluid for the brake system 10. The fluid within the reservoir 20 is preferably held at or about atmospheric pressure but may store the fluid at other pressures if so desired. The brake system 10 may include a fluid level sensor (not shown) for detecting the fluid level of the reservoir 20. Note that in the schematic illustration of FIG. 1, conduit lines may not be specifically drawn leading to the reservoir 20 but may be represented by conduits ending and labelled with T1, T2, or T3 indicating that these various conduits are connected to one or more tanks or sections of the reservoir 20. Alternatively, the reservoir 20 may include multiple separate housings. As will be discussed in detail below, the plunger assembly 18 of the brake system 10 functions as a source of pressure to provide a desired pressure level to the wheel brakes 12*a*, 12*b*, 12*c*, and 12*d* during a typical or normal brake apply. Fluid from the wheel brakes 12*a*, 12*b*, 12*c*, and 12*d* may be returned to the plunger assembly 18 and/or diverted to the reservoir 20.

The brake system 10 includes an electronic control unit (ECU) 22. The ECU 22 may include microprocessors. The ECU 22 receives various signals, processes signals, and controls the operation of various electrical components of the brake system 10 in response to the received signals. The ECU 22 can be connected to various sensors such as pressure sensors, travel sensors, switches, wheel speed sensors, and steering angle sensors. The ECU 22 may also be connected to an external module (not shown) for receiving information related to yaw rate, lateral acceleration, longitudinal acceleration of the vehicle such as for controlling the brake system 10 during vehicle stability operation. Additionally, the ECU 22 may be connected to the instrument cluster for collecting and supplying information related to warning indicators such as an ABS warning light, a brake fluid level warning light, and a traction control/vehicle stability control indicator light.

The brake system 10 further includes first and second isolation valves 30 and 32. The isolation valves 30 and 32 may be solenoid actuated three way valves. The isolation valves 30 and 32 are generally operable to two positions, as schematically shown in FIG. 1. The first and second isolation valves 30 and 32 each have a port in selective fluid communication with an output conduit 34 generally in communication with an output of the plunger assembly 18, as will be discussed below. The first and second isolation valves 30 and 32 also includes ports that are selectively in fluid communication with conduits 36 and 38, respectively, when the first and second isolation valves 30 and 32 are non-energized, as shown in FIG. 1. The first and second isolation valves 30 and 32 further include ports that are in fluid communication with conduits 40 and 42, respectively, which provide fluid to and from the wheel brakes 12*a*, 12*b*, 12*c*, and 12*d*.

In a preferred embodiment, the first and/or second isolation valves 30 and 32 may be mechanically designed such that flow is permitted to flow in the reverse direction (from conduit 34 to the conduits 36 and 38, respectively) when in their de-energized positions and can bypass the normally closed seat of the valves 30 and 32. Thus, although the 3-way valves 30 and 32 are not shown schematically to indicate this fluid flow position, it is noted that that the valve design may permit such fluid flow. This may be helpful in performing diagnostic routines and bleeding of the brake system 10.

The system 10 further includes various solenoid actuated valves (slip control valve arrangement) for permitting controlled braking operations, such as ABS, traction control, vehicle stability control, and regenerative braking blending. A first set of valves includes a first apply valve 50 and a first dump valve 52 in fluid communication with the conduit 40 for cooperatively supplying fluid received from the first isolation valve 30 to the wheel brake 12*a*, and for cooperatively relieving pressurized fluid from the wheel brake 12*a* to a reservoir conduit 53 in fluid communication with the reservoir 20. A second set of valves includes a second apply valve 54 and a second dump valve 56 in fluid communication with the conduit 40 for cooperatively supplying fluid received from the first isolation valve 30 to the wheel brake 12*b*, and for cooperatively relieving pressurized fluid from the wheel brake 12*b* to the reservoir conduit 53. A third set of valves includes a third apply valve 58 and a third dump valve 60 in fluid communication with the conduit 42 for cooperatively supplying fluid received from the second isolation valve 32 to the wheel brake 12*c*, and for cooperatively relieving pressurized fluid from the wheel brake 12*c* to the reservoir conduit 53. A fourth set of valves includes a fourth apply valve 62 and a fourth dump valve 64 in fluid communication with the conduit 42 for cooperatively supplying fluid received from the second isolation valve 32 to the wheel brake 12*d*, and for cooperatively relieving pressurized fluid from the wheel brake 12*d* to the reservoir conduit 53. Note that in a normal braking event, fluid flows through the non-energized open apply valves 50, 54, 58, and 62. Additionally, the dump valves 52, 56, 60, and 64 are preferably in their non-energized closed positions to prevent the flow of fluid to the reservoir 20.

The brake pedal unit 14 is connected to a brake pedal 70 and is actuated by the driver of the vehicle as the driver presses on the brake pedal 70. A brake sensor or switch 72 may be connected to the ECU 22 to provide a signal indicating a depression of the brake pedal 70. As will be discussed below, the brake pedal unit 14 may be used as a back-up source of pressurized fluid to essentially replace the normally supplied source of pressurized fluid from the plunger assembly 18 under certain failed conditions of the brake system 10. The brake pedal unit 14 can supply pressurized fluid in the conduits 36 and 38 (that are normally closed off at the first and second isolation valves 30 and 32 during a normal brake apply) to the wheel brake 12*a*, 12*b*, 12*c*, and 12*d* as required.

The brake pedal unit 14 includes a housing having a multi-stepped bore 80 formed therein for slidably receiving various cylindrical pistons and other components therein. The housing may be formed as a single unit or include two or more separately formed portions coupled together. An input piston 82, a primary piston 84, and a secondary piston 86 are slidably disposed within the bore 80. The input piston 82 is connected with the brake pedal 70 via a linkage arm 76. Leftward movement of the input piston 82, the primary piston 84, and the secondary piston 86 may cause, under certain conditions, a pressure increase within an input chamber 92, a primary chamber 94, and a secondary chamber 96, respectively. Various seals of the brake pedal unit 14 as well as the structure of the housing and the pistons 82, 84, and 86 define the chambers 92, 94, and 96. For example, the input chamber 92 is generally defined between the input piston 82 and the primary piston 84. The primary chamber 94 is generally defined between the primary piston 84 and the secondary piston 86. The secondary chamber 96 is generally defined between the secondary piston 86 and an end wall of the housing formed by the bore 80.

The input chamber 92 is in fluid communication with the pedal simulator 16 via a conduit 100, the reason for which will be explained below. The input piston 82 is slidably disposed in the bore 80 of the housing of the brake pedal unit 14. An outer wall of the input piston 82 is engaged with a lip seal 102 and a seal 104 mounted in grooves formed in the housing. A passageway 106 (or multiple passageways) is formed through a wall of the piston 82. As shown in FIG. 1, when the brake pedal unit 14 is in its rest position (the driver is not depressing the brake pedal 70), the passageway 106 is located between the lip seal 102 and the seal 104. In the rest position, the passageway 106 permits fluid communication between the input chamber 92 and the reservoir 20 via a conduit 108. Sufficient leftward movement of the input piston 82, as viewing FIG. 1, will cause the passageway 106 to move past the lip seal 102, thereby preventing the flow of fluid from the input chamber 92 into the conduit 108 and the reservoir 20. Further leftward movement of the input piston 82 will pressurize the input chamber 92 causing fluid to flow into the pedal simulator 16 via the conduit 100. As fluid is diverted into the pedal simulator 16, a simulation chamber 110 within the pedal simulator 16 will expand causing movement of a piston 112 within the pedal simulator 16. Movement of the piston 112 compresses a spring assembly, schematically represented as a spring 114. The compression of the spring 114 provides a feedback force to the driver of the vehicle which simulates the forces a driver feels at the brake pedal 70 in a conventional vacuum assist hydraulic brake system, for example. The spring 114 of the pedal simulator 16 can include any number and types of spring members as desired. For example, the spring 114 may include a combination of low rate and high rate spring elements to provide a non-linear force feedback. The spring 114 of the pedal simulator 16 may be housed within a non-pressurized chamber 122 in fluid communication with the reservoir 20 (T1).

The simulation chamber 110 of the pedal simulator 16 is in fluid communication with the conduit 100 which is in fluid communication with the input chamber 92. A normally closed solenoid actuated simulator valve 116 is positioned within the conduit 100 to selectively prevent the flow of fluid from the input chamber 92 to the simulation chamber 110, such as during a failed condition in which the brake pedal unit 14 is utilized to provide a source of pressurized fluid to the wheel brakes. In its energized open position, the simulator valve 116 permits fluid communication between the input chamber 92 of the brake pedal unit 14 and the simulation chamber 110 of the pedal simulator 16. The brake system 10 may further include a check valve 118 which is in a parallel path arrangement with a restricted orifice 120 in the conduit 100. The check valve 118 and the restricted orifice 120 could be integrally built or formed in the simulator valve 116 or may be formed separately therefrom. The restricted orifice 120 provides damping during a spike apply in which the driver depresses the brake pedal 70 rapidly and forcefully. This damping provides a force feedback making depression of the brake pedal 70 feel more like a traditional vacuum booster, which may be a desirable characteristic of the brake system 10. The damping may also provide a more accurate relationship between brake pedal travel and vehicle deceleration by generally avoiding too much brake pedal travel for the vehicle deceleration that can be delivered by the brake system 10. The check valve 118 provides an easy flow path and allows the brake pedal 70 to return quickly, which allows the associated brake pressure to decrease quickly per the driver's intent.

As discussed above, the input chamber 92 of the brake pedal unit 14 is selectively in fluid communication with the reservoir 20 via a conduit 108 and the passageway 106 formed in the input piston 82. The brake system 10 may include an optional simulator test valve 130 located within the conduit 108. The simulator test valve 130 may be electronically controlled between an open position, as shown in FIG. 1, and a powered closed position. The simulator test valve 130 is not necessarily needed during a normal boosted brake apply or for a manual push through mode. The simulator test valve 130 can be energized to a closed position during various testing modes to determine the correct operation of other components of the brake system 10. For example, the simulator test valve 130 may be energized to a closed position to prevent venting to the reservoir 20 via the conduit 108 such that a pressure build up in the brake pedal unit 14 can be used to monitor fluid flow to determine whether leaks may be occurring through seals of various components of the brake system 10.

The primary chamber 94 of the brake pedal unit 14 is in fluid communication with the second isolation valve 32 via the conduit 38. The primary piston 84 is slidably disposed in the bore 80 of the housing of the brake pedal unit 14. An outer wall of the primary piston 84 is engaged with a lip seal 132 and a seal 134 mounted in grooves formed in the housing. One or more passageways 136 are formed through a wall of the primary piston 84. The passageway 136 is located between the lip seal 132 and the seal 134 when the primary piston 84 is in its rest position, as shown in FIG. 1. Note that in the rest position the lip seal 132 is just slightly to the left of the passageway 136, thereby permitting fluid communication between the primary chamber 94 and the reservoir 20.

The secondary chamber 96 of the brake pedal unit 14 is in fluid communication with the first isolation valve 30 via the conduit 36. The secondary piston 86 is slidably disposed in the bore 80 of the housing of the brake pedal unit 14. An outer wall of the secondary piston 86 is engaged with a lip seal 140 and a seal 142 mounted in grooves formed in the housing. One or more passageways 144 are formed through a wall of the secondary piston 86. As shown in FIG. 1, the passageway 144 is located between the lip seal 140 and the seal 142 when the secondary piston 86 is in its rest position. Note that in the rest position the lip seal 140 is just slightly to the left of the passageway 144, thereby permitting fluid communication between the secondary chamber 96 and the reservoir 20 (T2).

If desired, the primary and secondary pistons 84 and 86 may be mechanically connected with limited movement therebetween. The mechanical connection of the primary and secondary pistons 84 and 86 prevents a large gap or distance between the primary and secondary pistons 84 and 86 and prevents having to advance the primary and secondary pistons 84 and 86 over a relatively large distance without any increase in pressure in the non-failed circuit. For example, if the brake system 10 is under a manual push through mode and fluid pressure is lost in the output circuit relative to the secondary piston 86, such as for example in the conduit 36, the secondary piston 86 will be forced or biased in the leftward direction due to the pressure within the primary chamber 94. If the primary and secondary pistons 84 and 86 were not connected together, the secondary piston 86 would freely travel to its further most left-hand position, as viewing FIG. 1, and the driver would have to depress the pedal 70 a distance to compensate for this loss in travel. However, because the primary and secondary pistons 84 and 86 are connected together, the secondary piston 86 is prevented from this movement and relatively little loss of travel occurs in this type of failure. Any suitable mechanical connection between the primary and secondary pistons 84 and 86 may be used. For example, as schematically shown in FIG. 1, the right-hand end of the secondary piston 86 may include an outwardly extending flange that extends into a groove formed in an inner wall of the primary piston 84. The groove has a width which is greater than the width of the flange, thereby providing a relatively small amount of travel between the first and secondary pistons 84 and 86 relative to one another.

The brake pedal unit 14 may include an input spring 150 generally disposed between the input piston 82 and the primary piston 84. Additionally, the brake pedal unit 14 may include a primary spring (not shown) disposed between the primary piston 84 and the secondary piston 86. A secondary spring 152 may be included and disposed between the secondary piston 86 and a bottom wall of the bore 80. The input, primary and secondary springs may have any suitable configuration, such as a caged spring assembly, for biasing the pistons in a direction away from each other and also to properly position the pistons within the housing of the brake pedal unit 14.

The brake system 10 may further include a pressure sensor 156 in fluid communication with the conduit 36 to detect the pressure within the secondary pressure chamber 96 and for transmitting the signal indicative of the pressure to the ECU 22. Additionally, the brake system 10 may further include a pressure sensor 158 in fluid communication with the conduit 34 for transmitting a signal indicative of the pressure at the output of the plunger assembly 18.

Figure 2:
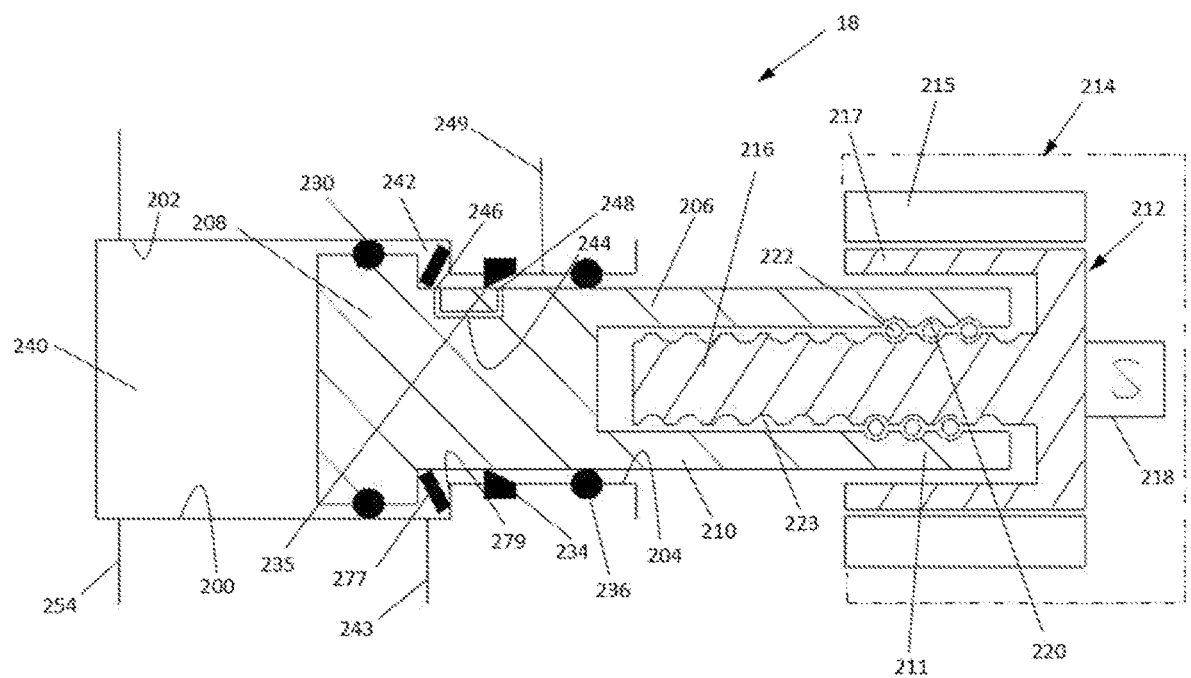
FIG. 2 is an enlarged schematic illustration of the plunger assembly of the brake system of FIG. 1.

As shown schematically in FIG. 2, the plunger assembly 18 includes a housing having a multi-stepped bore 200 formed therein. The bore 200 includes a first portion 202 and a second portion 204. A piston 206 is slidably disposed within the bore 200. The piston 206 includes an enlarged end portion 208 connected to a smaller diameter central portion 210. The piston 206 has a second end 211 connected to a ball screw mechanism, indicated generally at 212. The ball screw mechanism 212 is provided to impart translational or linear motion of the piston 206 along an axis defined by the bore 200 in both a forward direction (leftward as viewing FIGS. 1 and 2), and a rearward direction (rightward as viewing FIGS. 1 and 2) within the bore 200 of the housing. In the embodiment shown, the ball screw mechanism 212 includes a motor, indicated schematically and generally at 214, which is electrically connected to the ECU 22 for actuation thereof. The motor 214 rotatably drives a screw shaft 216. The motor 214 generally includes a stator 215 and a rotor 217. In the schematic embodiment shown in FIG. 2, the rotor 217 and the screw shaft 216 are integrally formed together. The second end 211 of the piston 206 includes a threaded bore 220 and functions as a driven nut of the ball screw mechanism 212. The ball screw mechanism 212 includes a plurality of balls 222 that are retained within helical raceways 223 formed in the screw shaft 216 and the threaded bore 220 of the piston 206 to reduce friction.

Although a ball screw mechanism 212 is shown and described with respect to the plunger assembly 18, it should be understood that other suitable mechanical linear actuators may be used for imparting movement of the piston 206. It should also be understood that although the piston 206 functions as the nut of the ball screw mechanism 212, the piston 206 could be configured to function as a screw shaft of the ball screw mechanism 212. Of course, under this circumstance, the screw shaft 216 would be configured to function as a nut having internal helical raceways formed therein. The piston 206 may include structures (not shown) engaged with cooperating structures formed in the housing of the plunger assembly 18 to prevent rotation of the piston 206 as the screw shaft 216 rotates around the piston 206. For example, the piston 206 may include outwardly extending splines or tabs (not shown) that are disposed within longitudinally extending grooves (not shown) formed in the housing of the plunger assembly 18 such that the tabs slide along within the grooves as the piston 206 travels in the bore 200.

As will be discussed below, the plunger assembly 18 is preferably configured to provide pressure to the conduit 34 when the piston 206 is moved in both the forward and rearward directions. The plunger assembly 18 includes a seal 230 mounted on the enlarged end portion 208 of the piston 206. The seal 230 slidably engages with the inner cylindrical surface of the first portion 202 of the bore 200 as the piston 206 moves within the bore 200. A seal 234 and a seal 236 are mounted in grooves formed in the second portion 204 of the bore 200. The seals 234 and 236 slidably engage with the outer cylindrical surface of the central portion 210 of the piston 206. A first pressure chamber 240 is generally defined by the first portion 202 of the bore 200, the enlarged end portion 208 of the piston 206, and the seal 230. An annular shaped second pressure chamber 242, located generally behind the enlarged end portion 208 of the piston 206, is generally defined by the first and second portions 202 and 204 of the bore 200, the seals 230 and 234, and the central portion 210 of the piston 206. The seals 230, 234, and 236 can have any suitable seal structure.

Although the plunger assembly 18 may be configured to any suitable size and arrangement, in one embodiment, the effective hydraulic area of the first pressure chamber 240 is greater than the effective hydraulic area of the annular shaped second pressure chamber 242. The first pressure chamber 240 generally has an effective hydraulic area corresponding to the diameter of the central portion 210 of the piston 206 (the inner diameter of the seal 234) since fluid is diverted through the conduits 254, 34, and 243 as the piston 206 is advanced in the forward direction. The second pressure chamber 242 generally has an effective hydraulic area corresponding to the diameter of the first portion 202 of the bore 200 minus the diameter of the central portion 210 of the piston 206. This configuration provides that on the back stroke in which the piston 206 is moving rearwardly, less torque (or power) is required by the motor 214 to maintain the same pressure as in its forward stroke. Besides using less power, the motor 214 may also generate less heat during the rearward stroke of piston 206. Under circumstances when high brake pressure is desired, the plunger assembly 34 could be operated from a forward stroke to a rearward stroke. So while a forward stroke is used in most brake applications, a rearward pressure stroke can be utilized. Also, under circumstances in which the driver presses on the pedal 90 for long durations, the brake system 10 could be operated to maintain brake pressure (instead of continuously energizing the plunger assembly 34) by controlling the first and second plunger valves 250 and 252 (as will be discussed below) to closed positions and then turn off the motor or the plunger assembly 34.

The plunger assembly 18 preferably includes a sensor, schematically shown as 218, for indirectly detecting the position of the piston 206 within the bore 200. The sensor 218 is in communication with the ECU 22. In one embodiment, the sensor 218 detects the rotational position of the rotor 217 which may have metallic or magnetic elements embedded therein. Since the rotor 217 is integrally formed with the shaft 216, the rotational position of the shaft 216 corresponds to the linear position of the piston 206. Thus, the position of the piston 206 can be determined by sensing the rotational position of the rotor 217 via the sensor 218.

The piston 206 of the plunger assembly 18 includes a passageway 244 formed therein. The passageway 244 defines a first port 246 extending through the outer cylindrical wall of the piston 206 and is in fluid communication with the secondary chamber 242. The passageway 244 also defines a second port 248 extending through the outer cylindrical wall of the piston 206 and is in fluid communication with a portion of the bore 200 located between the seals 234 and 236. The second port 248 is in fluid communication with a conduit 249 which is in fluid communication with the reservoir 20 (T3). When in the rest position, as shown in FIG. 2, the pressure chambers 240 and 242 are in fluid communication with the reservoir 20 via the conduit 249. This helps in ensuring a proper release of pressure at the output of the plunger assembly 18 and within the pressure chambers 240 and 242 themselves. The venting of pressure prevents inadvertent actuation of the wheel brakes 12a, 12b, 12c, and 12d by any pressure remaining in the pressure chambers 240 and 242. After an initial forward movement of the piston 206 from its rest position, the port 248 will move past the lip seal 234, thereby closing off fluid communication of the pressure chambers 240 and 242 from the reservoir 20, thereby permitting the pressure chambers 240 and 242 to build up pressure as the piston 206 moves further.

Referring back to FIG. 1, the brake system 10 further includes a first plunger valve 250, and a second plunger valve 252. The first plunger valve 250 is preferably a solenoid actuated normally closed valve. Thus, in the non-energized state, the first plunger valve 250 is in a closed position, as shown in FIG. 1. The second plunger valve 252 is preferably a solenoid actuated normally open valve. Thus, in the non-energized state, the second plunger valve 252 is in an open position, as shown in FIG. 1. A check valve may be arranged within the second plunger valve 252 so that when the second plunger valve 252 is in its closed position, fluid may still flow through the second plunger valve 252 in the direction from a first output conduit 254 (from the first pressure chamber 240 of the plunger assembly 18) to the conduit 34 leading to the isolation valves 30 and 32. Note that during a rearward stroke of the piston 206 of the plunger assembly 18, pressure may be generated in the second pressure chamber 242 for output into the conduit 34.

Generally, the first and second plunger valves 250 and 252 are controlled to permit fluid flow at the outputs of the plunger assembly 18 and to permit venting to the reservoir 20 (T3) through the plunger assembly 18 when so desired. For example, the first plunger valve 250 may be energized to its open position during a normal braking event so that both of the first and second plunger valves 250 and 252 are open (which may reduce noise during operation). Preferably, the first plunger valve 250 is almost always energized during an ignition cycle when the engine is running. Of course, the first plunger valve 250 may be purposely moved to its closed position such as during a pressure generating rearward stroke of the plunger assembly 18. The first and second plunger valves 250 and 252 are preferably in their open positions when the piston 206 of the plunger assembly 18 is operated in its forward stroke to maximize flow. When the driver releases the brake pedal 70, the first and second plunger valves 250 and 252 preferably remain in their open positions. Note that fluid can flow through the check valve within the closed second plunger valve 252, as well as through a check valve 258 from the reservoir 20 depending on the travel direction of the piston 206 of the plunger assembly 18.

It may be desirable to configure the first plunger valve 250 with a relatively large orifice therethrough when in its open position. A relatively large orifice of the first plunger assembly 250 helps to provide an easy flow path therethrough. The second plunger valve 252 may be provided with a much smaller orifice in its open position as compared to the first plunger valve 250. One reason for this is to help prevent the piston 206 of the plunger assembly 18 from rapidly being back driven upon a failed event due to the rushing of fluid through the first output conduit 254 into the first pressure chamber 240 of the plunger assembly 18, thereby preventing damage to the plunger assembly 18. As fluid is restricted in its flow through the relatively small orifice, dissipation will occur as some of the energy is transferred into heat. Thus, the orifice should be of a sufficiently small size so as to help prevent a sudden catastrophic back drive of the piston 206 of the plunger assembly 18 upon failure of the brake system 10, such as for example, when power is lost to the motor 214 and the pressure within the conduit 34 is relatively high.

As shown in FIG. 2, the plunger assembly 18 may include an optional spring member, such as a spring washer 277, to assist in cushioning such a rapid rearward back drive of the piston 206. The spring washer 277 may also assist in cushioning the piston 206 moving at any such speed as it approaches a rest position near its most retracted position within the bore 200. Schematically shown in FIG. 2, the spring washer 277 is located between the enlarged end portion 208 and a shoulder 279 formed in the bore 200 between the first and second portions 202 and 204. The spring washer 277 can have any suitable configuration which deflects or compresses upon contact with the piston 206 as the piston 206 moves rearwardly. For example, the spring washer 277 may be in the form of a metal conical spring washer. Alternatively, the spring washer 277 may be in the form of a wave spring. Although the spring washer 277 is shown mounted within the bore 200 of the plunger assembly 18, the spring washer 277 may alternatively be mounted on the piston 206 such that the spring washer 277 moves with the piston 206. In this configuration, the spring washer 277 would engage with the shoulder 279 and compress upon sufficient rightward movement of the piston 206.

The first and second plunger valves 250 and 252 provide for an open parallel path between the pressure chambers 240 and 242 of the plunger assembly 18 during a normal braking operation. Although a single open path may be sufficient, the advantage of having both the first and second plunger valves 250 and 252 is that the first plunger valve 250 may provide for an easy flow path through the relatively large orifice thereof, while the second plunger valve 252 may provide for a restricted orifice path during certain failed conditions (when the first plunger valve 250 is de-energized to its closed position.

During a typical or normal braking operation, the brake pedal 70 is depressed by the driver of the vehicle. In a preferred embodiment of the brake system 10, the brake pedal unit 14 includes one or more travel sensors 270 (for redundancy) for producing signals transmitted to the ECU 22 that are indicative of the length of travel of the input piston 82 of the brake pedal unit 14.

During normal braking operations, the plunger assembly 18 is operated to provide pressure to the conduit 34 for actuation of the wheel brakes 12a, 12b, 12c, and 12d. Under certain driving conditions, the ECU 22 communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal brake apply, the flow of pressurized fluid from the brake pedal unit 14, generated by depression of the brake pedal 70, is diverted into the pedal simulator 16. The simulator valve 116 is actuated to divert fluid through the simulator valve 116 from the input chamber 92. Note that the simulator valve 116 is shown in its energized state in FIG. 1. Thus, the simulator valve 116 is a normally closed solenoid valve. Also note that fluid flow from the input chamber 92 to the reservoir 20 is closed off once the passageway 106 in the input piston 82 moves past the seal 104.

During the duration of a normal braking event, the simulator valve 116 remains open, preferably. Also during the normal braking operation, the isolation valves 30 and 32 are energized to secondary positions to prevent the flow of fluid from the conduits 36 and 38 through the isolation valves 30 and 32, respectively. Preferably, the isolation valves 30 and 32 are energized throughout the duration of an ignition cycle such as when the engine is running instead of being energized on and off to help minimize noise. Note that the primary and secondary pistons 84 and 86 are not in fluid communication with the reservoir 20 due to their passageways 136 and 144, respectively, being positioned past the lip seals 132 and 140, respectively. Prevention of fluid flow through the isolation valves 30 and 32 hydraulically locks the primary and secondary chambers 94 and 96 of the brake pedal unit 14 preventing further movement of the primary and secondary pistons 84 and 86.

It is generally desirable to maintain the isolation valves 30 and 32 energized during the normal braking mode to ensure venting of fluid to the reservoir 20 through the plunger assembly 18 such as during a release of the brake pedal 70 by the driver. As best shown in FIG. 1, the passageway 244 formed in the piston 206 of the plunger assembly 18 permits this ventilation.

During normal braking operations, while the pedal simulator 16 is being actuated by depression of the brake pedal 70, the plunger assembly 18 can be actuated by the ECU 22 to provide actuation of the wheel brakes 12a, 12b, 12c, and 12d. The plunger assembly 18 is operated to provide desired pressure levels to the wheel brakes 12a, 12b, 12c, and 12d compared to the pressure generated by the brake pedal unit 14 by the driver depressing the brake pedal 70. The electronic control unit 22 actuates the motor 214 to rotate the screw shaft 216 in the first rotational direction. Rotation of the screw shaft 216 in the first rotational direction causes the piston 206 to advance in the forward direction (leftward as viewing FIGS. 1 and 2). Movement of the piston 206 causes a pressure increase in the first pressure chamber 240 and fluid to flow out of the first pressure chamber 240 and into the conduit 254. Fluid can flow into the conduit 34 via the open first and second plunger valves 250 and 252. Note that fluid is permitted to flow into the second pressure chamber 242 via a conduit 243 as the piston 206 advances in the forward direction. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through open apply valves 50, 54, 58, and 62 while the dump valves 52, 56, 60, and 64 remain closed. When the driver lifts off or releases the brake pedal 70, the ECU 22 can operate the motor 214 to rotate the screw shaft 216 in the second rotational direction causing the piston 206 to retract withdrawing the fluid from the wheel brakes 12a, 12b, 12c, and 12d. The speed and distance of the retraction of the piston 206 is based on the demands of the driver releasing the brake pedal 70 as sensed by the sensor 218. Of course, if the driver rapidly releases the brake pedal 90, the plunger assembly 14 may be operated to avoid such an instant drop in pressure. Under certain conditions, such as in a non-boosted slip control event, the pressurized fluid from the wheel brakes 12a, 12b, 12c, and 12d may assist in back-driving the ball screw mechanism 212 moving the piston 206 back towards its rest position. Note that when the driver releases the brake pedal 90, the first and second plunger valves 250 and 252 preferably remain in their open positions during a non-slip control event.

In some situations, the piston 206 of the plunger assembly 18 may reach its full stroke length within the bore 200 of the housing and additional boosted pressure is still desired to be delivered to the wheel brakes 12a, 12b, 12c, and 12d. The plunger assembly 18 is a dual acting plunger assembly such that it is configured to also provide boosted pressure to the conduit 34 when the piston 206 is stroked rearwardly (rightward) or in a reverse direction. This has the advantage over a conventional plunger assembly that first requires its piston to be brought back to its rest or retracted position before it can again advance the piston to create pressure within a single pressure chamber. If the piston 206 has reached its full stroke, for example, and additional boosted pressure is still desired, the second plunger valve 252 is energized to its closed check valve position. The first plunger valve 250 is de-energized to its closed position. The electronic control unit 22 actuates the motor 214 in a second rotational direction opposite the first rotational direction to rotate the screw shaft 216 in the second rotational direction. Rotation of the screw shaft 216 in the second rotational direction causes the piston 206 to retract or move in the rearward direction (rightward as viewing FIGS. 1 and 2). Movement of the piston 206 causes a pressure increase in the second pressure chamber 242 and fluid to flow out of the second pressure chamber 242 and into the conduit 243 and the conduit 34. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through the opened apply valves 50, 54, 58, and 62 while dump valves 52, 56, 60, and 64 remain closed. In a similar manner as during a forward stroke of the piston 206, the ECU 22 can also selectively actuate the apply valves 50, 54, 58, and 62 and the dump valves 52, 56, 60, and 64 to provide a desired pressure level to the wheel brakes 12a, 12b, 12c, and 12d, respectively. When the driver lifts off or releases the brake pedal 70 during a pressurized rearward stroke of the plunger assembly 18, the first and second plunger valves 250 and 252 are preferably operated to their open positions, although having only one of the valves 250 and 252 open would generally still be sufficient. Note that when transitioning out of a slip control event, the ideal situation would be to have the position of the piston 206 and the displaced volume within the plunger assembly 18 correlate exactly with the given pressures and fluid volumes within the wheel brakes 12a, 12b, 12c, and 12d. However, when the correlation is not exact, fluid can be drawn from the reservoir 20 via the check valve 258 into the chamber 240 of the plunger assembly 18.

During a braking event, the ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, regenerative braking, and autonomous braking events by general operation of the plunger assembly 18 in conjunction with the apply valves and the dump valves. Even if the driver of the vehicle is not depressing the brake pedal 70, the ECU 22 can operate the plunger assembly 18 to provide a source of pressurized fluid directed to the wheel brakes, such as during an autonomous vehicle braking event.

In the event of a loss of electrical power to portions of the brake system 10, the brake system 10 provides for manual push through or manual apply such that the brake pedal unit 14 can supply relatively high pressure fluid to the conduits 36 and 38. During an electrical failure, the motor 214 of the plunger assembly 18 might cease to operate, thereby failing to produce pressurized hydraulic brake fluid from the plunger assembly 18. The isolation valves 30 and 32 will shuttle (or remain) in their positions to permit fluid flow from the conduits 36 and 38 to the wheel brakes 12a, 12b, 12c, and 12d. The simulator valve 116 is shuttled to its closed position to prevent fluid from flowing out of the input chamber 92 to the pedal simulator 16. During the manual push-through apply, the input piston 82, the primary piston 84, and the secondary piston 86 will advance leftwardly such that the passageways 106, 136, 144 will move past the seals 102, 132, and 140, respectively, to prevent fluid flow from their respective fluid chambers 92, 94, and 96 to the reservoir 20, thereby pressurizing the chambers 92, 94, and 96. Fluid flows from the chambers 94 and 96 into the conduits 38 and 36, respectively, to actuate the wheel brakes 12a, 12b, 12c, and 12d.

For proper operation of the plunger assembly 18, it is obviously desirable for the ECU 22 to know the actual position of the piston 206 within the housing of the plunger assembly 18. It is not only important to determine the actual position of the piston 206 initially after manufacture and assembly of the plunger assembly 18 but also during the operational life of the plunger assembly 18. The precision of the sensor 218 as well as the precision of the ball screw mechanism 212 can be designed and manufactured such that the position of the piston 206 can be properly determined to a sufficient tolerance during movement of the piston 206 within the plunger assembly 18. In other words, the ball screw mechanism 212 can be designed in such a high level of quality and precision that the sensor 218 will be able to reliably track the position of the piston 206 as the piston 206 is moved within the plunger assembly 18 by the motor 214 and the ball screw mechanism 212. The ECU 22 may receive continuous signals from the sensor 218 to assure that the proper position of the piston 206 relative to housing of the plunger assembly 18 is maintained. Thus, knowledge of the position of the piston 206 during operation of the plunger assembly 18 is generally not an issue for proper operation of the plunger assembly 18.

However, it is important to know and determine a homing or starting position of the piston 206 within the bore 200 such that all later positions of the piston can stem from and be determined from this known homing position. The ECU 22 could be configured to store data associated with the last known position of the piston 206 prior to an electrical shut down of the brake system 10. Upon the next power up cycle of the brake system 10, this last known position may be used to re-determine the position of the piston 206. However, during periods when the brake system 10 is not powered, the position of the piston 206 may physically shift or move from the previously known position prior to the last electrical shut off. For example, vibrations experienced by the plunger assembly 18 during a powered down event could shift the piston 206 from the previously known position. This shifting of the piston 206 would cause a false assumption of the physical position of the piston 206. To overcome these issues, it is desirable to provide an initialization process upon every electrical system start up such that the actual position of the piston 206 can be determined and detected to provide a starting or homing position (an initial linear zero position) of the piston 206. After determining a homing position of the piston 206, every position of the piston 206 can then be based and tracked from this starting position.

The homing initialization process preferably starts at a system power up such that electrical power is supplied to the brake system 10. The system power up can correspond with an ignition cycle, wherein the vehicle is started. For example, for vehicles having an internal combustion engine, the ignition cycle generally corresponds with starting or igniting the engine and ends when the engine is turned off. Typically upon engine shut down, most of the electrical systems of the vehicle are also shut down and powered off. The brake system 10 may be one of such systems that are powered down. Even for non-internal combustion engine vehicles, such as fully electric or hybrid vehicles, an ignition cycle can be used to describe a shut down and powered off cycle of the braking system.

Figure 3:
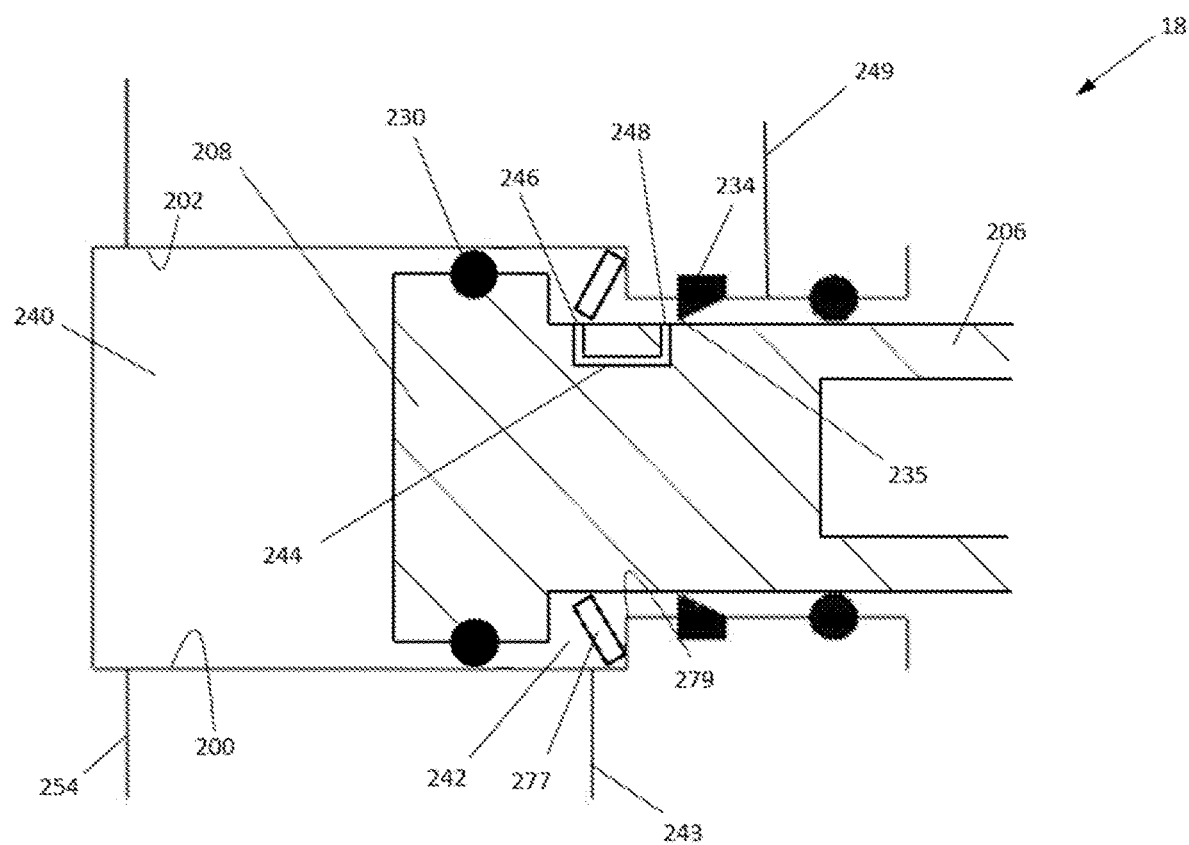
FIG. 3 is an enlarged schematic partial illustration of the plunger assembly showing the piston of the plunger assembly in a random orientation prior to a homing initialization process.

There is illustrated in FIG. 3, a schematic representation of the plunger assembly 18 in a random orientation such that the piston 206 has moved from an at rest position, as shown in FIG. 2, to a random unknown forward position. For example, the position of the piston 206 in FIG. 3 could have been caused by vibration acting on the plunger assembly 18 when the engine was shut off and the brake system 10 was powered down. In the FIG. 3, the piston 206 is shown such that a gap exists between the spring washer 277 and the enlarged end portion 208 of the piston 206. It should be understood that the schematic drawings herein of the plunger assembly 18 are not to scale and certain features of the plunger assembly 18 are shown exaggerated for clarity and descriptive purposes. The same exaggeration may be true for the positions of the various components of the plunger assembly 18 since the actual movements and positions may so small in reality that they would not be noticeable in the drawing figures. For example, in FIG. 3, the piston 206 may have only moved a millimeter or by a fraction of a millimeter to its random unknown position. Thus, FIG. 3 illustrates an exaggerated movement of the position of the piston 206 from an at rest position, such as in FIG. 2.

To start the diagnostic homing initialization process, the brake system 10 is first powered up, such as during the beginning of a vehicle ignition cycle. Thus, power will be restored to the ECU 22 and/or the plunger assembly 18 amongst other components of the brake system 10. The ECU 22 can operate the brake system 10 in any suitable configuration during the homing initialization process. However, preferably, none of the valves of the brake system 10 are energized during this process. The ECU 22 controls the motor 214 to actuate the ball screw mechanism 212 to rotate the screw shaft 216 in the second rotational direction thus retracting the piston 206 towards the right, as viewing FIG. 3. Note that the piston 206 will now be moving in the direction towards the spring washer 277. However, if desired, the ECU 22 may first actuate the motor 214 to rotate in the first rotational direction to advance the piston 206 to the left, as viewing FIG. 3, to assure that some gap exists between the spring washer 277 and the end portion 208 of piston 206 prior to advancing the piston 206 rearwardly towards the spring washer 277.

Figure 4:
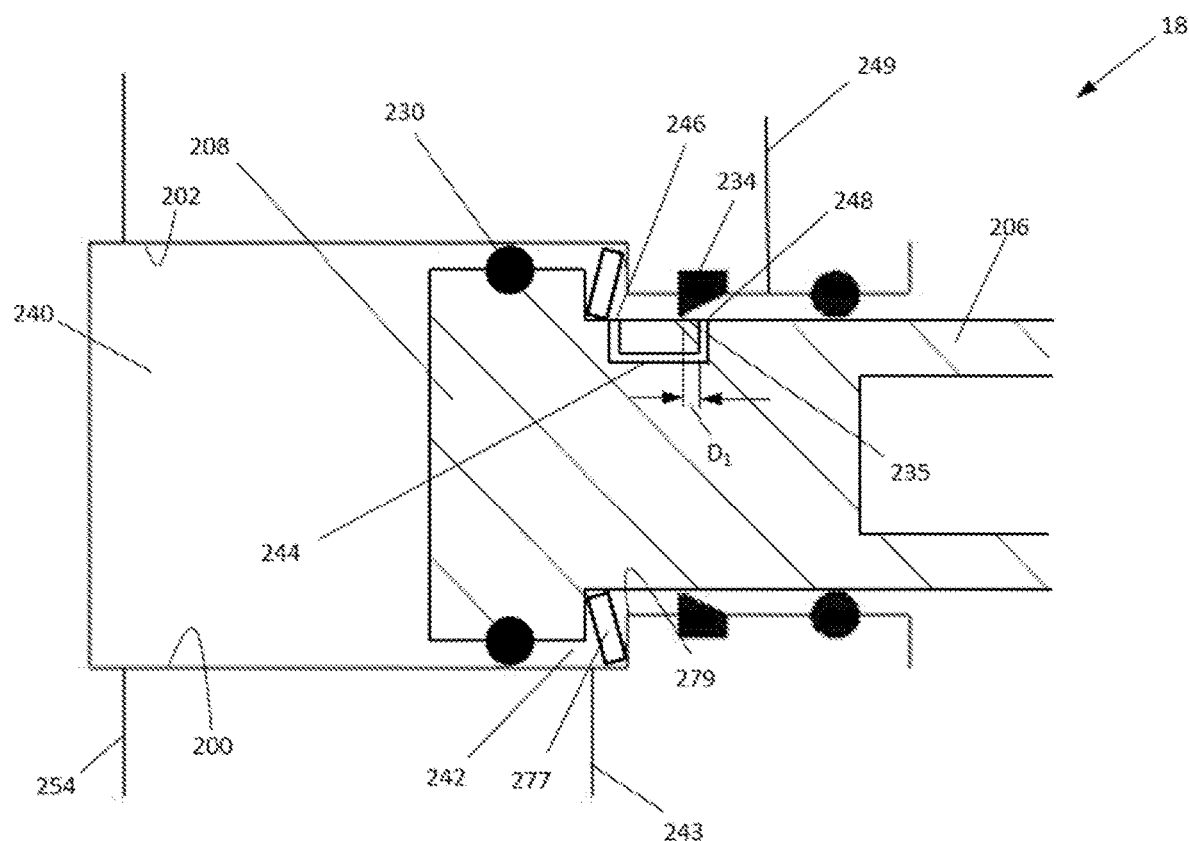
FIG. 4 is an enlarged schematic partial illustration of the plunger assembly showing the piston of the plunger assembly in a retracted position during the homing initialization process.

To determine the homing position, the travel of the piston 206 in the rightward direction is continued and monitored by the ECU 22 via readings from the sensor 218 until certain conditions are met that indicate that the piston 206 has been moved to a desired position. Generally, the piston 206 is moved rightward until it is detected that the piston 206 engages with an end stop. The end stop may be defined as the shoulder 279 or the optional spring washer 277. Preferably, the piston 206 is moved rightward until the enlarged end portion 208 of the piston 206 engages with the spring washer 277. At this point, the spring washer 277 may be slightly compressed, as shown exaggerated in FIG. 4. FIG. 4 illustrates the piston 206 in its retracted position. To help prevent damage to the components of the plunger assembly 18, the spring washer 277 is used to cushion or bias the piston 206 as it moves towards the shoulder 279. Thus, the spring washer 277 assists in preventing the enlarged end 208 of the piston 206 from contacting the shoulder 279 directly. However, it should be understood that use of the spring washer 277 is optional, and the plunger assembly 18 could be configured without the spring washer 277 such that the enlarged end portion 208 engages directly against the shoulder 279.

Figure 5:
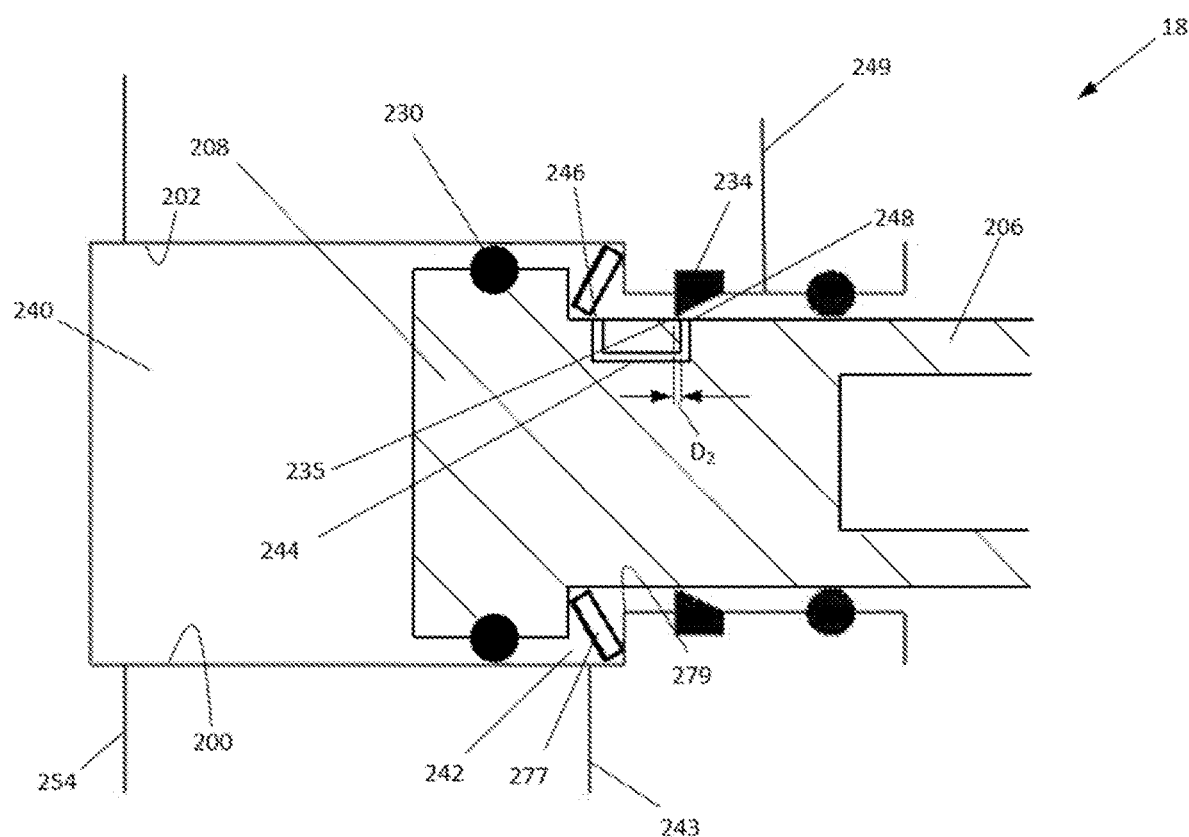
FIG. 5 is an enlarged schematic partial illustration of the plunger assembly of FIG. 3 in a linear zero homing position.

As will be explained in further detail below, certain conditions will be met and the ECU 22 is able to determine that the spring washer 277 has been contacted and engaged by the enlarged end portion 208, and will accordingly stop the motor 214 to prevent further compression of the spring washer 277. At this time, the ECU 22 may consider this retracted position, as shown in FIG. 4, the homing position. This homing position generally corresponds to a furthermost right-hand position within the bore 200 of the housing of the plunger assembly 18, as shown in FIG. 4. Alternatively, the ECU 22 may advance the piston 206 slightly in the leftward direction so as to decompress the spring washer 277, and determine this new piston location as the homing position, such as shown in FIG. 2. In yet another preferred process that will be described in detail below, the ECU 22 may have undergone a compensation port determination process and move the piston 206 forward by about a distance $D_1$, shown in FIG. 4, and park the piston 206 in a "linear zero" position such that the second port 248 is just slightly to the right of the lip seal 234, as shown in FIG. 5.

One of the conditions that can be monitored for detecting the piston 206 engaging with an end stop, such as the spring washer 277, is the state of the motor 214. More specifically, the ECU 22 may monitor current applied to the motor 214 to sense when the motor 214 stalls or stops upon engagement with the spring washer 277. During the homing initialization process, the motor 214 is preferably controlled at low torque and low speed so as not to cause significant compression of the spring washer 277. During movement of the piston 206, the ECU 22 monitors the motor current to sense when there is a distinct current rise when the enlarged portion 208 engages the spring washer 277, as compared to the relatively smooth operation of the motor 214 when the piston 206 moves freely. This method indirectly senses the torque output of the motor 214. For example, it may be preferred that the motor 214 be stopped when a torque threshold of about 0.3 N is reached.

Another condition that can be monitored to detect when the piston 206 engages an end stop is the speed at which the piston 206 is retracted. The ECU 22 can control the motor 212 at a constant state to move the piston 206 via the ball screw mechanism 212 at a relatively constant speed. From this information, the speed at which the piston 206 should be traveling, assuming it is not compressing the spring washer 277, can be calculated based on information from the sensor 218. Upon engagement with the spring washer 277 and compression thereof, the speed of the piston 206 will be generally stopped (or slowed by the compression of the spring washer 277). Detecting the immediate reduction in speed by the sensor 218 indicates that the piston 206 is starting to compress the spring washer 277. Preferably, the ECU 22 controls the motor 214 at a relatively low speed and low torque during the homing initialization process. For example, the piston 206 can be moved at a speed of about 10 mm/sec. At such as slow speed it may be determined that the presence of the optional spring washer 277 is not necessary, and therefore, may be omitted without worries of damaging the plunger assembly 18.

When either of the current sensing condition or the predetermined speed value condition is met, which correspond to the initial compression of the spring washer 277, the ECU 22 can halt movement of the piston 206. This retracted position of the piston 206 may then be used as the homing position, as described above.

In conjunction with a diagnostic homing initializing procedure, it may be desirable to conduct a method of determining the location of an ideal compensation port position of the piston 206, i.e., the position of the compensation port 248 relative to the lip seal 234. This procedure may be performed at any time. For example, the procedure may be performed after every homing initialization and/or performed periodically throughout the life the plunger assembly 18. However, it has been found that this procedure need only be performed once after manufacture and assembly of the brake system 10 such as immediately after the brake system 10 has been filled with brake fluid and bled.

Referring now to FIG. 5, the piston 206 is in its rest position such that generally no pressure is being generated from the plunger assembly 18. The spring washer 277 is not under any significant compression. The piston 206 is shown in a preferred position wherein the port 248 is adjacent to but just slightly to the right of an inner diameter engagement edge 235 of the lip seal 234. In FIG. 5, the engagement edge 235 of the lip seal 234 is shown spaced from the port 248 by a very small distance D2. In this position, the pressure chambers 240 and 242 are in fluid communication with the reservoir 20 via the passageway 244 and the conduit 249. The fluid communication between the reservoir 20 and the pressure chambers 240 and 242 helps to assure that there is no pressure build-up in the chambers 240 and 242 which may cause unnecessary caliper wear at the associated wheel brakes, for example. Thus, pressure at the wheel brakes 12a, 12b, 12c, and 12d can be vented through the plunger assembly 18 to the reservoir 20 when the plunger assembly 18 is in its rest position.

Figure 6:
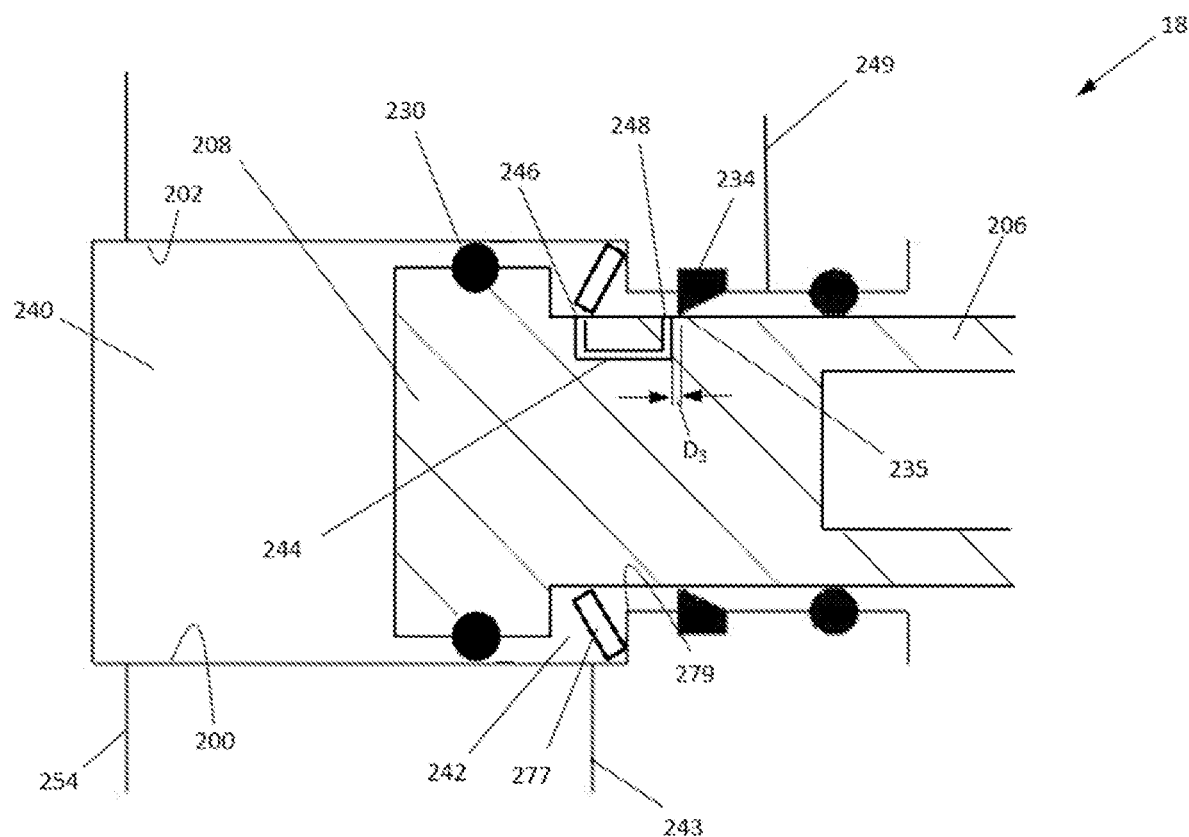
FIG. 6 is an enlarged schematic partial illustration of the plunger assembly showing the piston in a forward position just after a compensation port cut off.

As described above with respect to operation of the plunger assembly 18, to build up pressure within the pressure chambers 240 and 242, the fluid communication from the port 248 to the reservoir 20 is cut off or closed. This is accomplished by movement of the piston 206 in a leftward direction, as viewing FIG. 5, until the port 248 is to the left of an inner diameter tip 235 of the lip seal 234 by some distance D3, as shown in FIG. 6. Since the piston 206 of the plunger assembly 18 can be precisely controlled in a forward and rearward direction at a given speed, an ideal compensation port position of the piston 206 can be determined by monitoring boost pressure change characteristics of the plunger assembly 18. An ideal compensation port position of the piston 206 is shown generally in FIG. 5, wherein the port 248 is shown just slightly to the right of the engagement edge 235 of the lip seal 234. This position is also defined as a linear zero position. Compared to the position of the port 248 in FIG. 2, less travel in the left-hand direction is required by the piston 206 to close off the port 248, thereby providing a faster pressure build-up of the pressure chambers 240 and/or 242 of the plunger assembly 18. Due to design and manufacturing tolerances, different plunger assemblies may be built such that the location of the piston 206 within the bore 200 are slightly different from one another. However, all plunger assemblies are preferably designed such that after assembly, it is assured that the port 248 is to the right of the lip seal 234. To assure this position, however, the port 248 may be farther to the right of the lip seal 234 then ideally desired. Thus, it is desirable to determine the location of an ideal compensation port position of the piston 206 for each plunger assembly 18. FIG. 2 may represent a plunger assembly 18 after initial manufacture and assembly and prior to any method of determining the location of an ideal compensation port has been performed on the plunger assembly 18. The method of determining the location of an ideal compensation port position of the piston 206, i.e., the position of the compensation port 248 relative to the engagement edge 235 of the lip seal 234, may be initiated after manufacture and assembly of the plunger assembly 18. Since design and assembly tolerances may slightly differ from one unit to the next, precisely locating the compensation port 248 for each plunger assembly 18 may be desired.

The method of determining the location of an ideal compensation port position of the piston 206 (the location of the compensation port 248 relative to the engagement edge 235 of the lip seal 234) may be accomplished by monitoring boost pressure change characteristics of the plunger assembly 18. Different methods may be used. For example, the ideal compensation port position or linear zero may be obtained by first discovering when a minimum pressure is built-up in the pressure chamber 240 when the piston 206 is advanced in the forward direction. This method will now be described. In a first step, the piston 206 of the plunger assembly 18 is preferably retracted to an at rest position or at a homing position, as shown in FIG. 4. Preferably, all of the valves in the brake system 10 are in their de-energized positions. The ECU 22 actuates the motor 214 in the second rotational direction to cause the piston 206 to retract in the rightward direction to place the plunger assembly 18 in its at rest or homing position, as shown in FIG. 4. In this position, the port 248 is to the right of the lip seal 234 such that the pressure chambers 240 and 242 are in fluid communication with the reservoir 20. The motor 214 is preferably moved at a relatively low speed, such as at about 250 rpm.

It is noted that in the position as shown in FIG. 5, the spring washer 277 may be in a relaxed state such that the enlarged end 208 of the piston 206 is either resting against or slightly spaced from the spring washer 277. Alternatively, the spring washer 277 may be slightly compressed by the enlarged end 208 of the piston 206. The ECU 22 can monitor the state of the plunger assembly 18 by determining when the piston 206 has reached its rest position when the piston 206 is no longer moving, as sensed by the sensor 218, yet the motor 214 is still being operated. The ECU 22 can then stop the motor 214. A slight amount of time may transpire during this determination which may cause a slight compression of the spring washer 277. Additionally, a slight compression may be caused by the presence of a return spring (not shown) biasing the piston 206 in the rightward direction.

In a preferred embodiment of the method, the ECU 22 operates some of valves of the brake system 10 to their energized positions after the plunger assembly 18 has been placed in its at rest or homing position, as discussed above. For example, the ECU 22 may energize the first and second three way isolation valves 30 and 32 to permit the flow of fluid through the first and second isolation valves 30 and 32 from the conduit 34. The first plunger valve 250 is also preferably energized to its open position. Additionally, all of the dump valves 52, 56, 60, and 64 are preferably energized to their open positions to permit fluid flow to the reservoir 20. When the plunger assembly 18 is in its at rest position as shown in FIG. 5, the ECU 22 preferably notes or writes the position of the piston 206 in NVRAM such that a base line knowledge of the position of the piston 206 prior to the test is known. Note that the sensor 218 detects the rotational position of the rotor 217 which corresponds to the linear position to the piston 206 such that the ECU 22 is able to track and record the position of the piston 206 during this process.

Figure 7:
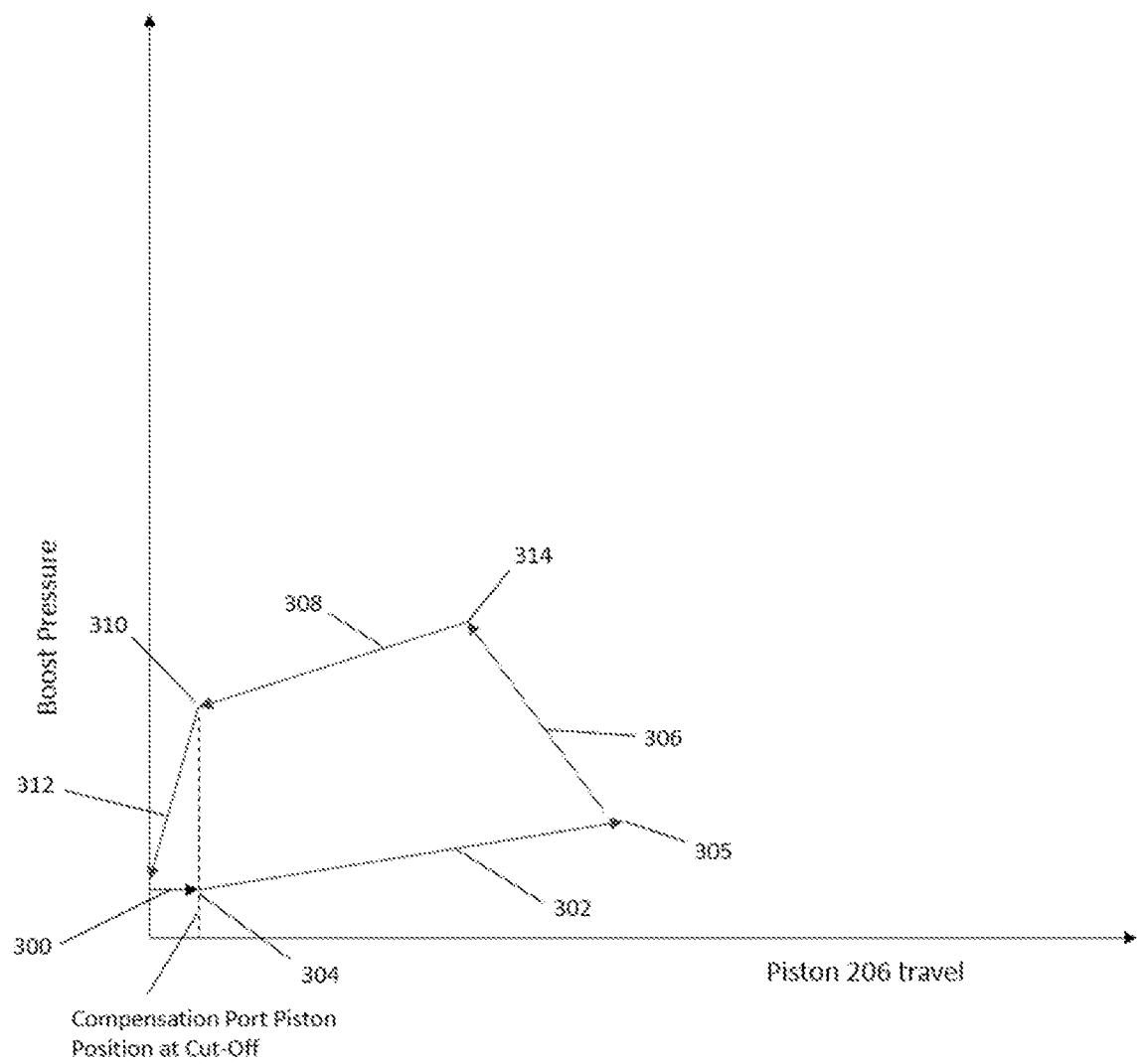
FIG. 7 is a graphical representation of the control of the plunger assembly during the compensation port learning process.

The ECU 22 then actuates the motor 214 and the ball screw mechanism 212 in the first rotational direction to drive the piston 206 in the first direction, or leftward as viewing FIG. 5. The motor 214 can be actuated to any speed, such as about 750 rpm. The initial movement of the piston 206 is graphically represented as the relatively small horizontal path 300 in FIG. 7. FIG. 7 is a graphical representation of the control of the plunger assembly 18 during the compensation port learning process. Note that the graphical representation of FIG. 7 is not to scale and is used for descriptive purposes. After a sufficient movement of the piston 206, the port 248 moves past the lip seal 234 causing the compensation port cut-off (such as shown in FIG. 6), thereby closing off fluid communication between the reservoir 20 and the pressure chambers 240 and 242. At this point, continued movement of the piston 206 causes a rise in pressure within the pressure chambers 240 and 242 which can be sensed by the pressure sensor 156 in fluid communication with the conduit 34 (at the output of the plunger assembly 18). This build-up of pressure as the piston 206 is advanced in the forward direction is represented as the path 302 in FIG. 7.

Figure 8:
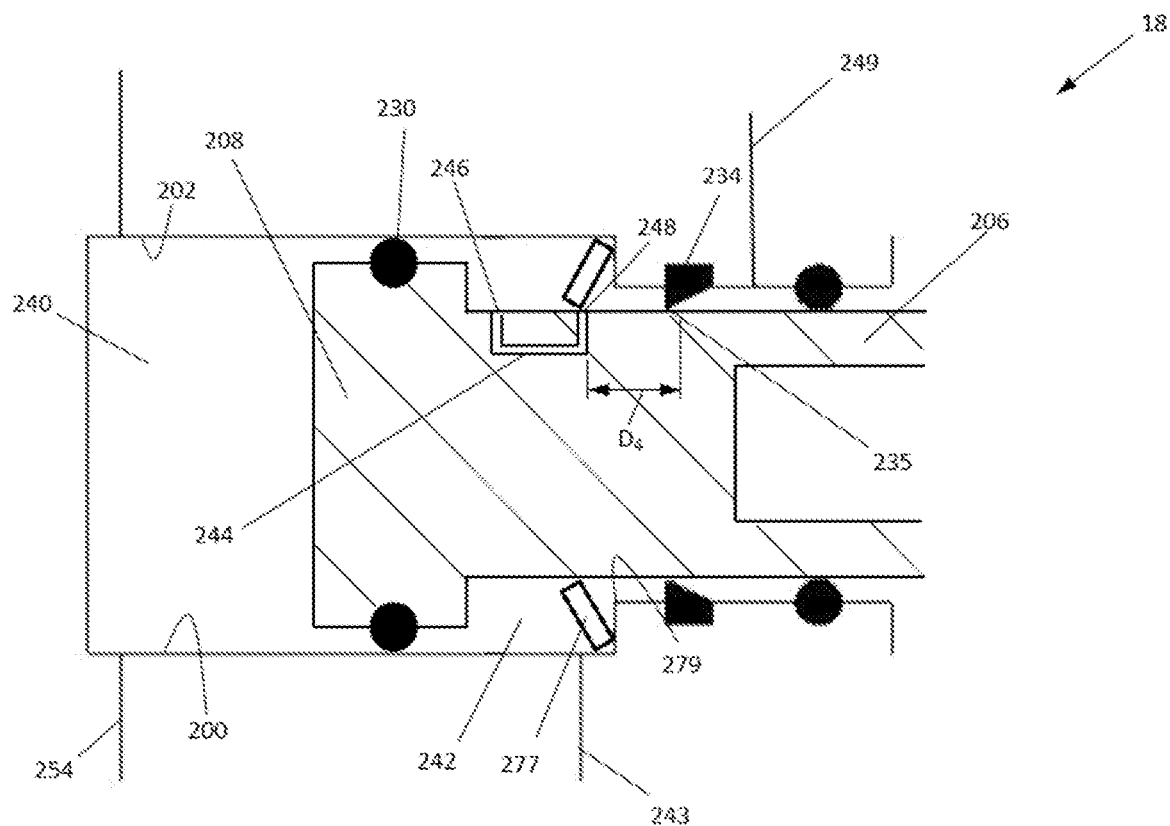
FIG. 8 is an enlarged schematic partial illustration of the plunger assembly showing the piston in an advanced forward position after compensation port cut off.

Note that a knee point 304 in the graph of FIG. 7 is representative of the closing off or cut-off of the port 248 which is detectable as a change in boost pressure characteristics sensed by the pressure sensor 156. Thus, the position of the port 248 relative to the lip seal 234 can be determined at this knee point 304. The ECU 22 may write this positional information at the cut off into NVRAM. FIG. 8 illustrates the position of the piston 206 at the end of the path 302 at a point 305 after the piston 206 has been moved beyond the compensation port cut off, represented at 304, by some distance D4, such as 25 mm for example. Due to the high accuracy and precision of the plunger assembly 18, the travel distance of the piston 206 can be monitored by the sensor 218, thus providing an accurate location of the piston 206 within the bore 200. The position of the piston 206 at the knee-point 304 can be logged by the ECU 22. Based on this information, it may then be desirable to determine a new homing position of the piston 206 such that the compensation port 248 is positioned adjacent to but just slightly to the right of the inner diameter engagement edge 235 of the lip seal 234, as is shown in FIG. 5. This position is known as the linear zero position. In this position, the pressure chambers 240 and 242 are in fluid communication with the reservoir 20 via the conduit 249, yet only a very small travel distance of the piston 206 in the left-hand direction is required to close off this fluid communication. Although shown exaggerated in FIG. 5, the distance between the port 248 and the inner diameter engagement portion of the lip seal 234 may be relatively small, such as about 0.5 mm, for example.

In this first method of determining the location of an ideal compensation port position of the piston 206 as described above, the process essentially measures the difference between the retracted position of the piston 206, such as shown in FIG. 4, and the linear zero position of the piston 206, such as shown in FIG. 5. In the linear zero position, the port 248 is positioned adjacent the engagement edge 235 of the lip seal 234 by a relatively small distance D2 such that the port 248 is in fluid communication with the fluid reservoir 20 and with the pressure chamber 240.

In a second method of determining the location of an ideal compensation port position of the piston 206, a significant pressure drop in the output of the plunger assembly 18 is detected when the piston 206 is stroked in a reward pressure mode. This second method may be used as a redundant test performed immediately after the first method described above or the second method may be implemented solely. If done immediately after, the piston 206 is in the position shown in FIG. 8 and represented at the point 305 in the graphical representation of FIG. 7. The ECU 22 then preferably maintains the first and second three way isolation valves in their energized states. The second plunger valve 252 is preferably energized to its closed position. The first plunger valve 250 is de-energized to its closed positions. The dump valves are also preferably de-energized to their closed positions. The ECU 22 then operates the plunger assembly 18 to retract the piston 206 in a rearward stroke to provide a pressure build-up of the secondary pressure chamber 242 and in the conduit 34. The motor 214 may be operated in the second rotational direction at any suitable speed, such as about 750 rpm. This rearward stroke build-up of pressure is represented as the path 306 in the graph of FIG. 7. Instead of continuing along the path 306 all the way to the compensation port cut off, it is desirable to relieve pressure to reduce any high torque load on the motor 214 to prevent any damage to the motor 214. Thus, at a predetermined distance, represented by the knee point 314 in FIG. 7, the ECU 22 preferably energizes the first plunger valve 250 to its open position, and de-energizes the second plunger valve 252 to its open position. The first and second isolation valves 30 and 323 preferably remain energized. The ECU 22 preferably waits for a set period of time until the pressure within the secondary pressure chamber 242 and the conduit 34 stabilizes.

The ECU 22 then preferably rotates the motor 214 in the second rotational direction in a relatively slow speed, such as about 60 rpm, while calculating the pressure drop as a function of the reducing piston travel. The compensation port is detected when the port 248 moves to the right of the inner diameter portion of the lip seal 234. At this point, as represented by the knee point 310 in FIG. 7, a distinct increase in the pressure drop as a function of the reducing piston travel can be sensed via the pressure sensor 156 and sensor 218, thereby indicating that the port 248 of the piston 206 has just passed the lip seal 234 as fluid is now permitted to flow from the secondary pressure chamber 242 into the reservoir 20 via the passageway 244 and the conduit 249. Similar to the first method, the location of the piston 206 can be logged by the ECU 22 to NVRAM. The piston position for the compensation port cut off can be compared and/or updated relative to that learned in the first method. Note that continued rearward movement of the piston 206 is represented by the path 312 in FIG. 7. The ECU 22 continues to move the piston 206 rearward until a zero pressure level is reached or if a predetermined timeout has been reached, such as for example of about 5 sec.

Once the cut off position has been determined by one or both of the methods described above, the ECU 22 can continually park or position the piston 206 such that the port 248 is just slightly to the right of the engagement edge 235 of the lip seal 234, as shown in FIG. 5, in the linear zero position. This ideal compensation port position of the piston 206, wherein the port 248 is just slightly to the right of the engagement edge 235 of the lip seal 234, provides less travel in the left-hand direction as required by the piston 206 to close off the port 248. Thus, providing a faster pressure build-up of the pressure chambers 240 and/or 242 of the plunger assembly 18 during operation thereof. The linear zero position of the piston 206 within the bore 200 is then used as the starting position for each brake cycle. All later positions of the piston 206 can stem from and be determined from this known liner zero position.

With respect to the various valves of the brake system 10, the terms "operate" or "operating" (or "actuate", "moving", "positioning") used herein (including the claims) may not necessarily refer to energizing the solenoid of the valve, but rather refers to placing or permitting the valve to be in a desired position or valve state. For example, a solenoid actuated normally open valve can be operated into an open position by simply permitting the valve to remain in its non-energized normally open state. Operating the normally open valve to a closed position may include energizing the solenoid to move internal structures of the valve to block or prevent the flow of fluid therethrough. Thus, the term "operating" should not be construed as meaning moving the valve to a different position nor should it mean to always energizing an associated solenoid of the valve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of determining a homing position of a piston within a plunger assembly for a vehicle brake system at the beginning of an ignition cycle of the vehicle, the method comprising:
  (a) providing a plunger assembly having a housing defining a bore therein, wherein the plunger assembly includes a piston slidably disposed in the bore for pressurizing fluid within a pressure chamber when the piston is moved in a first direction, and wherein the plunger assembly further includes an electrically operated linear actuator for moving the piston within the bore;
  (b) providing electrical power to the linear actuator of the plunger assembly;
  (c) actuating the linear actuator to retract the piston in a second direction opposite the first direction towards an end stop;
  (d) detecting the piston engaging with the end stop; and
  (e) subsequently to step (d), actuating the linear actuator to advance the piston in the first direction by a forward predetermined distance, thereby placing the piston in a homing position.

2. The method of claim 1, wherein in step (d), the piston engaging with the end stop is detected by detecting an increase of electrical current of the linear actuator to a predetermined current value.

3. The method of claim 1, wherein in step (d), the piston engaging with the end stop is detected by detecting a reduction in speed of the piston to a predetermined speed value.

4. The method of claim 1, wherein the end stop of the plunger assembly includes a spring element.

5. The method of claim 4, wherein in step (d) contact of the piston with the end stop compresses the spring element.

6. The method of claim 4, wherein in step (d), the piston engaging with the end stop is detected by a reduction in speed of the piston to a predetermined speed value as the spring element is compressed by engagement of the piston.

7. The method of claim 1, wherein the linear actuator includes a motor.

8. The method of claim 7, wherein the linear actuator further includes a ball screw mechanism operated by the motor.

9. The method of claim 1, wherein the brake system is provided with a fluid reservoir and the plunger assembly further includes a port in fluid communication with the fluid reservoir and with the pressure chamber when the piston is in a first position, and wherein the port is prevented from being in fluid communication with the pressure chamber when the piston is in a second position caused by the spacial relationship between a seal and the port within the housing of the plunger assembly.

10. The method of claim 9, wherein subsequently to step (d);
   (f) measuring the difference between the retracted position of the piston and a linear zero position of the piston wherein the port is positioned adjacent the seal by a relatively small distance such that the port is in fluid communication with the fluid reservoir and with the pressure chamber.

11. The method of claim 10, wherein in step (f), the difference is measured by:
   (g) advancing the piston in the first direction from the retracted position; and
   (h) detecting a pressure increase in the pressure chamber of the plunger assembly, thereby detecting movement of the seal relative to the compensation port causing loss of fluid communication between the reservoir and the pressure chamber.

12. The method of claim 11, wherein subsequently to step (h), the method further comprises:
   (i) retracting the piston in a second direction opposite the first direction causing a pressure increase in a second pressure chamber within the plunger assembly; and
   (j) detecting a pressure decrease in the second pressure chamber of the plunger assembly, thereby detecting movement of the seal relative to the compensation port.

13. A method of determining a homing position of a piston within a plunger assembly for a vehicle brake system at the beginning of an ignition cycle of the vehicle, the method comprising:
   (a) providing a plunger assembly having a housing defining a bore therein, wherein the plunger assembly includes a piston slidably disposed in the bore for pressurizing fluid within a pressure chamber when the piston is moved in a first direction, and wherein the plunger assembly further includes an electrically operated linear actuator for moving the piston within the bore;
   (b) providing electrical power to the linear actuator of the plunger assembly;
   (c) actuating the linear actuator to retract the piston in a second direction opposite the first direction towards an end stop;
   (d) detecting the piston engaging with the end stop; and
   (e) subsequently to step (d), actuating the linear actuator to stop movement of the piston.

14. A method of detecting the position of a piston relative to a compensation port and seal configuration of a plunger assembly, the method comprising:
   (a) providing a fluid reservoir;
   (b) providing a plunger assembly having a housing defining a bore therein, wherein the plunger assembly includes a piston slidably disposed in the bore for pressurizing fluid within a pressure chamber when the piston is moved in a first direction by a linear actuator, and wherein the plunger assembly includes a port in fluid communication with the fluid reservoir and with the pressure chamber when the piston is in a first position, and wherein the port is prevented from being in fluid communication with the pressure chamber when the piston is in a second position caused by the spacial relationship between a seal and the port within the housing of the plunger assembly;
   (c) positioning the piston in a retracted position; and
   (d) measuring the difference between the retracted position of the piston and a linear zero position of the piston wherein the port is positioned adjacent the seal by a relatively small distance such that the port is in fluid communication with the fluid reservoir and with the pressure chamber.

15. The method of claim 14, wherein in step (d), the difference is measured by:
   (e) advancing the piston in the first direction from the retracted position; and
   (f) detecting a pressure increase in the pressure chamber of the plunger assembly, thereby detecting movement of the seal relative to the compensation port causing loss of fluid communication between the reservoir and the pressure chamber.

16. The method of claim 15, wherein subsequently to step (f), the method further comprises:
   (f) retracting the piston in a second direction opposite the first direction causing a pressure increase in a second pressure chamber within the plunger assembly; and
   (g) detecting a pressure decrease in the second pressure chamber of the plunger assembly, thereby detecting movement of the seal relative to the compensation port.

* * * * *